United States Patent
Zhou et al.

(10) Patent No.: US 7,202,623 B2
(45) Date of Patent: Apr. 10, 2007

(54) STARTUP PROCEDURE FOR SENSORLESS BRUSHLESS DC MOTOR

(75) Inventors: Genfu Zhou, Taoyuan Hsien (TW); Zhigan Wu, Taoyuan Hsien (TW); Jianping Ying, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 0 days.

(21) Appl. No.: 10/708,876

(22) Filed: Mar. 30, 2004

(65) Prior Publication Data

US 2005/0218848 A1 Oct. 6, 2005

(51) Int. Cl.
*H01K 39/41* (2006.01)

(52) U.S. Cl. ...................... 318/439; 318/434; 318/138; 318/254

(58) Field of Classification Search ................ 318/254, 318/138, 439, 64, 90, 276, 277, 278, 434
See application file for complete search history.

(56) References Cited

U.S. PATENT DOCUMENTS

| | | | | |
|---|---|---|---|---|
| 4,678,973 A | * | 7/1987 | Elliott et al. | 318/254 |
| 4,700,116 A | * | 10/1987 | Inoue et al. | 318/254 |
| 4,743,815 A | * | 5/1988 | Gee et al. | 318/254 |
| 5,017,845 A | * | 5/1991 | Carobolante et al. | 318/138 |
| 5,028,852 A | * | 7/1991 | Dunfield | 318/254 |
| 5,233,275 A | * | 8/1993 | Danino | 318/254 |
| 5,343,127 A | * | 8/1994 | Maiocchi | 318/254 |
| 5,397,972 A | * | 3/1995 | Maiocchi | 318/439 |

* cited by examiner

*Primary Examiner*—Rita Leykin
(74) *Attorney, Agent, or Firm*—Jianq Chyun IP Office

(57) ABSTRACT

A method for starting-up a motor having multiple stator windings and a rotor contains first providing current to two of the windings to excite a predefined phase and allowing one of the windings floating, Then, the back electromotive force (BEMF) induced in the floating winding is monitored. If a zero crossing of BEMF occurs in the floating winding within the maximum startup time, then it commutates to the next phase, which is adjacent to the first initial phase in the predetermined sequence of excitation phases. If no zero crossing of BEMF occurs in the floating winding within the maximum startup time, then it commutates to the next phase, which is functionally shifted by two phase-intervals from the predefined phase.

6 Claims, 5 Drawing Sheets

STARTUP PROCEDURE FOR SENSORLESS BRUSHLESS DC MOTOR

BACKGROUND OF INVENTION

1. Field of Invention

The present invention relates to a technique for starting a brushless DC (BLDC) motor. More particularly, the present invention relates to a technique for starting a sensorless BLDC motor.

2. Description of Related Art

Brushless DC motor (BLDCM) with rare-earth-element permanent magnets has been implemented in more and more wide range in recent years due to its outstanding advantages such as high efficiency, high power density, good controllability, and so on. A BLDC motor requires an inverter and a position detector to perform commutation. Conventionally, three Hall sensors are used as a position sensor for the BLDCM. However, the position of the Hall elements must be very precisely fixed, and the sensors themselves cause increase of the cost and reliability penalty. Many position sensorless BLDCM drivers, which detect the rotor position and produce the commutation signal from the back electromotive forces (BEMF) induced in the stator, have been proposed.

However, all of such sensorless motors face a startup problem: because the induced BEMF are not present when the motor is at rest, and the starting position of the rotor is unknown. For these reasons, several startup procedures have been developed in order to overcome this technical difficulty. A well-known method called 3-stage startup procedure consists in the following steps. First, a predefined initial phase is excited for a preset time, in order to push the rotor to a specific, known position. Such a procedure is called as orientation. Thereafter, a series of synchronous signals should be generated sequentially to accelerate the rotor in an open-circuit mode by increasing the frequency of such synchronous signals. This stage is called as separately controlled accelerating. When the motor reaches a speed at which rotor position signals become available and reliable, it comes to the stage of switching to self-controlled operation. The drawbacks of this startup procedure are that the rotor may not properly follow the excitation sequence and that a relatively long time is required.

Due to difficulty to decide the initial rotor position and the purpose of step-losing protection, the current at the startup has to be greater than the load torque plus the friction torque and the motor inertia load. Usually, twice rated current (or less) is excited to the motor to start up fast. So the frequently startup of the drivers causes plenty of copper loss and over heat at last, if the startup time is long and startup current is large always. Thus, there is a need for a fast, startup procedure for sensorless BLDCM.

The operation principle for a three-phase motor is briefly described as follows. The conventional three-phase motor is shown in FIG. 1. In FIG. 1, the three-phase motor is under a star configuration, i.e., having six different excitable phases and six equilibrium points in a 360 electrical degree. In the following description, each excitation phase is indicated with two capital letters, in whicha first letter (A, B, C) designates the winding through which the current conventionally flows from a supply terminal and toward the star node (N). The second capital letter with a "_" sign designates the winding through which the current comes from the star node (N) and flows toward another supply terminal.

FIG. 2 shows the torque curves of the motor in relation to different phase of excitation, as well as the corresponding curves of the three BEMFs. In FIG. 2, for each excited phase, for example AB_, the rotor tends to dispose itself in coincidence with the stable equilibrium points t180. Therefore, for a total of six phases there are six equilibrium points in 360 electrical degrees and there are many points of mechanically unstable equilibrium which are shifted by 180 electrical degrees from the respective stable equilibrium point. Moreover, it is evident that by exciting the phase AB_while the rotor is at rest, either a forward motion, or a backward motion, or no motion at all may occur, as shown in Table 1. The sign "-" of the torque means that the torque will startup a motor in a backward direction of rotation. The sign of the BEMF of the floating phase C is also shown, when the rotor runs in forward motion as shown in FIG. 2.

TABLE 1

| Rotor position | Torque | BEMF of phase C | Rotation direction |
| --- | --- | --- | --- |
| 0–t1 | + | + | Forward |
| t1–t180 | + | – | Forward |
| t180–t4 | – | – | Backward |
| T4–0 | – | + | Backward |
| T180 | 0 |  | Rest |

A method with better efficiency of startup procedure for a sencorless BLDC motor, based on the foregoing basics properties of the three-phase motor is till desired.

SUMMARY OF INVENTION

The invention provides a startup procedure for a sensorless BLDC motor to easily decide the initial rotor position.

The invention provides a method for starting-up a motor having multiple stator windings and a rotor. The method includes first providing current to two of the windings to excite a predefined phase and allowing one of the windings floating. Then, the back electromotive force (BEMF) induced in the floating winding is monitored. If a zero crossing of BEMF occurs in the floating winding within the maximum startup time, then it commutates to the next phase, which is adjacent to the first initial phase in the predetermined sequence of excitation phases. If no zero crossing of BEMF occurs in the floating winding within the maximum startup time, then it commutates to the next phase, which is functionally shifted by two phase-intervals from the predefined phase.

In another embodiment, a sufficient long masking time is included between providing current to two of the windings and monitoring the back electromotive force, so as to avoid parasitic BEMF ZCP detection.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Figure 3:
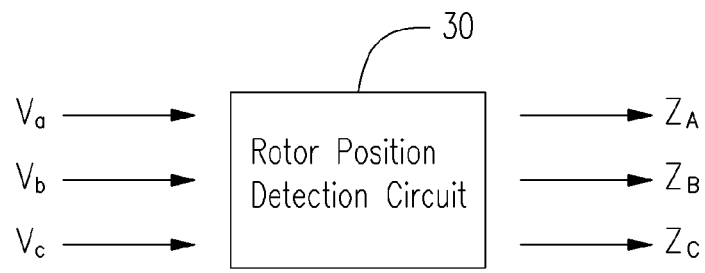
FIG. 3 is a block diagram of the rotor position detection circuit, according to the invention.

Before proposing the startup procedure of the invention, some operations features are considered. FIG. 3 is a block diagram of the rotor position detection circuit, according to the invention. In FIG. 3 the zero crossing points of the BEMFs induced by the rotation of the rotor, ZA, ZB, ZC may be respectively detected from the terminal voltage of the floating winding Va, Vb, Vc, by the rotor position detection circuit. Each of the zero crossing points ZA, ZB, ZC, have a positive-going zero crossing and a negative-going zero crossing, with which the next commutation to startup the motor is achieved, as shown in Table 2.

TABLE 2

| Current excited phase | Floating phase | Zero crossing point | Next excited phase |
|---|---|---|---|
| AB_ | C | Negative-going ZC | AC_ |
| AC_ | B | Positive-going ZB | BC_ |
| BC_ | A | Negative-going ZA | BA_ |
| BA_ | C | Positive-going ZC | CA_ |
| CA_ | B | Negative-going ZB | CB_ |
| CB_ | A | Positive-going ZA | AB_ |

When the motor changes direction of rotation, the BEMF changes sign accordingly. This means that a pseudo zero crossing point is generated during an inversion rotation, and this pseudo zero crossing point is useful for the startup algorithm of the method of the present invention, as to be more fully described as follows.

Figure 4:
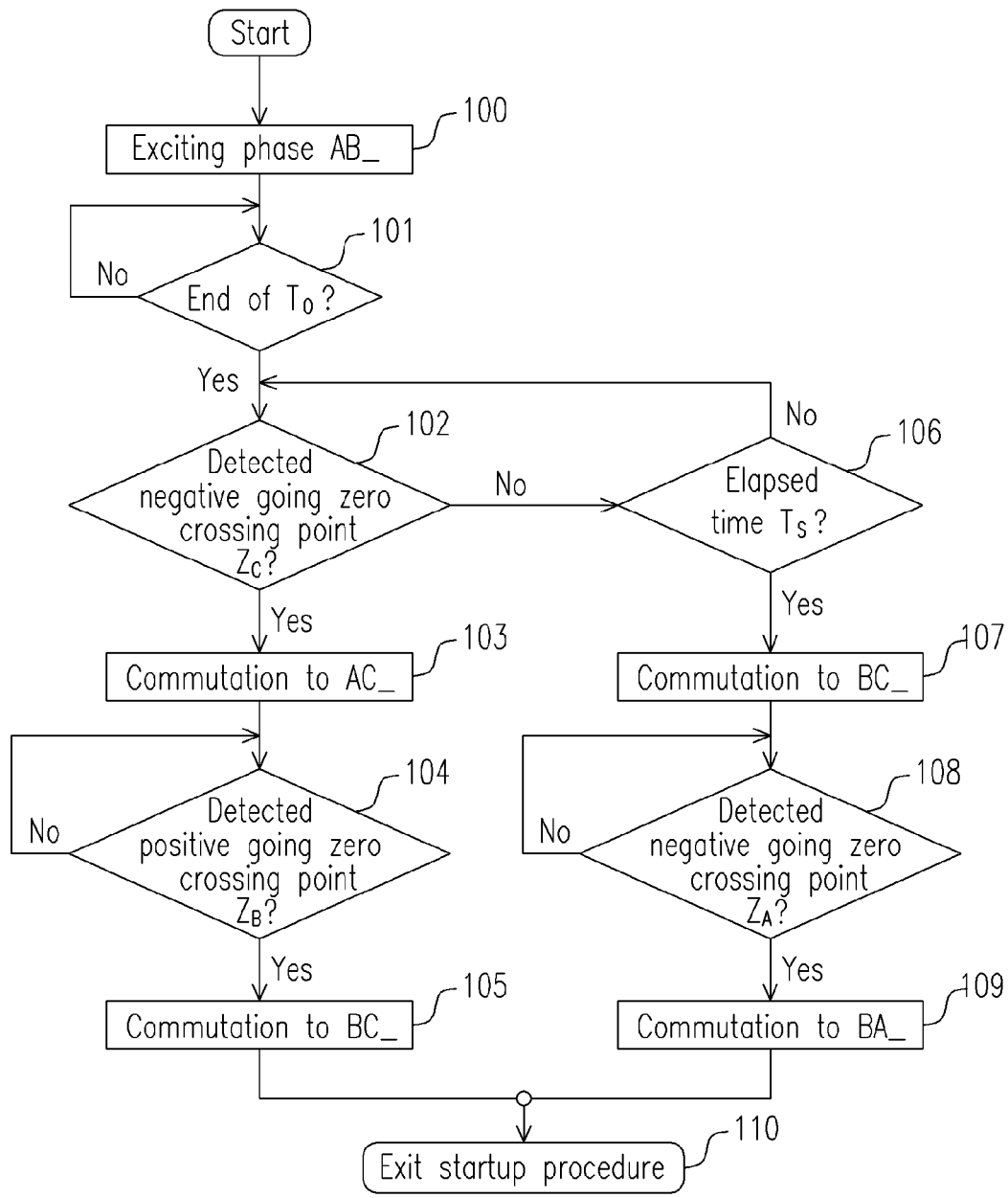
FIG. 4 shows a flow chart of the startup procedure, according to the embodiment of the present invention.

The startup process of the present invention, according to a preferred embodiment, may be illustrated in the form of an algorithm by the flow chart of FIG. 4.

Figure 1:
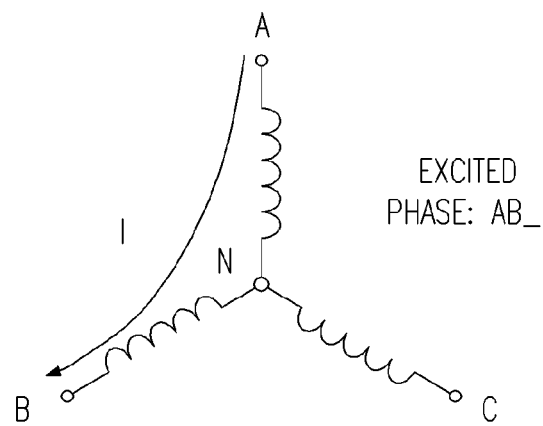
FIG. 1 shows a conventional star-configured three phases motor.
Figure 2:
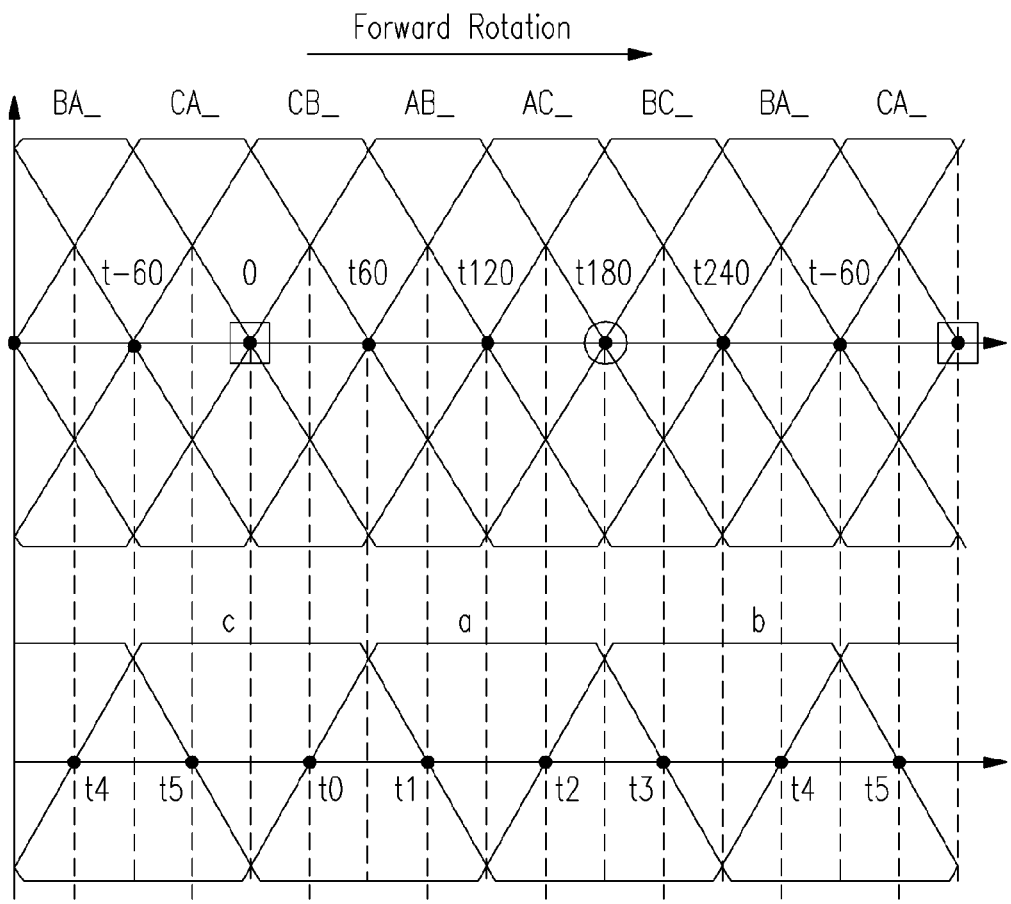
FIG. 2 illustrates the torque curves of the motor of FIG. 1 in relation to different phase of excitation, as well as the corresponding curves of the three BEMFs.

In FIG. 4, the procedure starts by exciting two predefined phases (step 100). Here, it is irrelevant for which phase is predefined. However, in the following description and in the set of examples, the phase AB_ is taken as the example for descriptions. In step 100, it is to call the rotor toward the equilibrium point t180 as shown in FIG. 2. At step 101, it is checked whether or not the masking time T0, which is the length depending on system inertia characteristic, is sufficiently long to avoid parasitic detection. When the masking time T0 is acceptable, it is checked in step 102 whether or not the negative-going zero crossing (ZC) of the BEMF in floating phase C has been detected. If it is not, the process moves to step 106. If the first BEMF zero-crossing point (ZCP), including the pseudo ZCP, of the floating phase C has been detected from positive to negative, the commutation is switched to the next phase AC_ immediately in step 103. Here, it is assumed that the output of BEMF ZCP detecting is negative when the speed is too low to detect the BEMF or when the rotor is at rest. In step 104, BEMF measurement is performed on winding B, then whether or not the positive-going zero crossing ZB is detected. If the positive-going zero crossing ZB has been detected, the commutation is performed in phase BC_ (step 105). After then, the startup routine is practically terminated in step 110 and the motor can be controlled by any suitable technique.

If it is judged that the negative going zero crossing ZC is not detected in Step 102, then the process moves to step 106. At step 106, it is checked whether or not its elapsed time is over the maximum startup time Ts, which is the length depending on system inertia characteristic. If it is not, the process returns to step 102, to detect the negative-zero going crossing point ZC. If Ts elapses, it is the case that the initial rest position of the rotor is in the equilibrium point t180, referring to the predefined phase AB_. The new phase to be excited in order to obtain the maximum torque in forward direction is BC_, a phase shifted by 120° from the preset phase AB_ at step 107. Then, BEMF measurement is performed on winding A, whether the negative-going zero crossing ZA is detected or not is checked in step 108. If the negative-going zero crossing has been detected, the process passes to step 109 to commutation BA_. After that, the startup routine is exited in step 110.

The different possible situation during startup procedure according to Table 1 and the relative behavior of the motor in performing the startup procedure is to be examined in detail as following.

Figure 5:
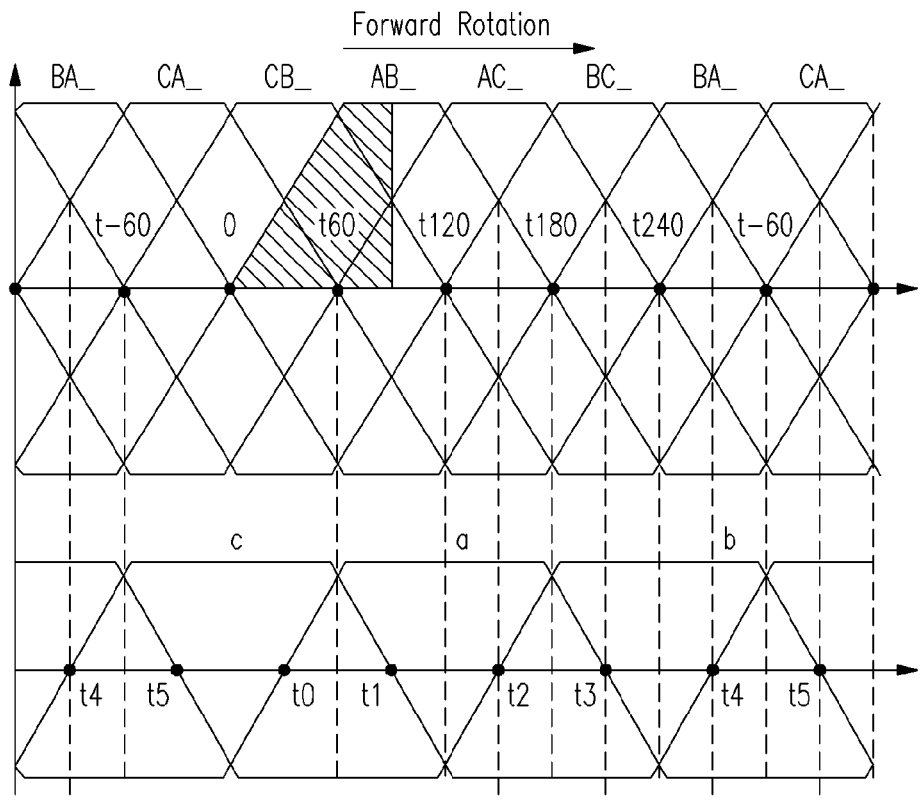
FIGS. 5–8 are drawings, schematically illustrating how the startup procedure is implemented in the different possible position of the rotor, according to the embodiments of the invention.

(1) Startup of the rotor from 0–t1: With reference to FIG. 5, the rotor is, for example, in an initial, rest position from 0–t0. By exciting the phase AB_for a preset time T0, the motor is accelerated in a forward direction of rotation due to the active torque, and the BEMF of phase C that is floating is positive. When the preset time T0 has elapsed, the detection of the BEMF ZCP is enabled. A negative-going zero crossing ZC is to be detected when the rotor comes to t1, and the commutation occurs immediately, switching to the next phase AC_. The rotor accelerates in forward direction. Once the second BEMF ZCP ZB is detected at t2, the phase BC_is connected no phase delay. After that, the startup routine is practically terminated and the motor may be controlled by any suitable technique.

Figure 6:
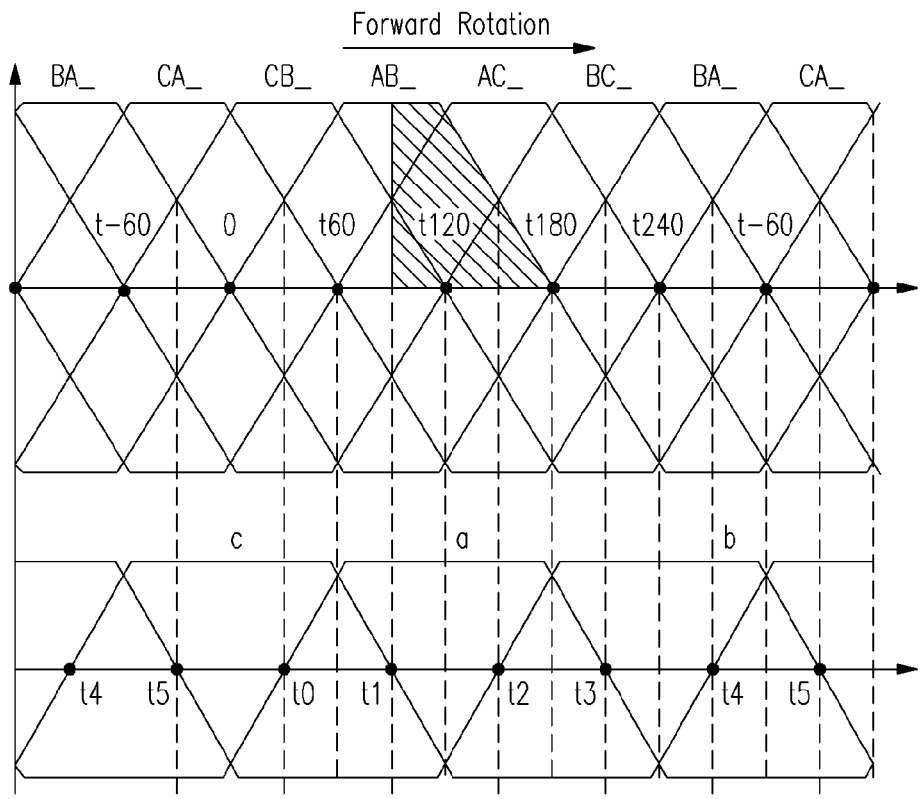

(2) Startup of the rotor from t1–t180: With reference to FIG. 6, the rotor is, for example, to be in an initial, rest position from t1–t180. By exciting the phase AB_ for a preset time T0, the motor is accelerated in a forward direction of rotation due to the active torque, while the BEMF of phase C that is floating is negative. When the preset time T0 has elapsed, the detection of the BEMF ZCP is enabled. There is no ZCP until the rotor comes to the equilibrium point t180. Due to the inertia of the motor and the load, the rotor wouldn't stop at the equilibrium t180. Once the rotor comes through the t180, the torque produced by the current AB-becomes passive. Therefore, the motor stops, then changes direction. Upon the change of direction of rotation of the rotor, the relative BEMFs also switch polarity. This presents a pseudo ZCP and the BEMF of phase C becomes positive. Then the rotor runs to t180 in backward until it comes through t180 again. Immediately the rotor running through t180, the rotor stops and changes direction to forward due to the active torque. A pseudo ZCP of phase C is detected from positive to negative, and the commutation is performed, switching to the next phase AC_. The rotor accelerates in forward direction. Once the BEMF of the floating phase B is detected positive, the commutation is switched to the next phase BC_. After that, the startup routine is practically terminated and the motor may be controlled by any suitable technique.

Figure 7:
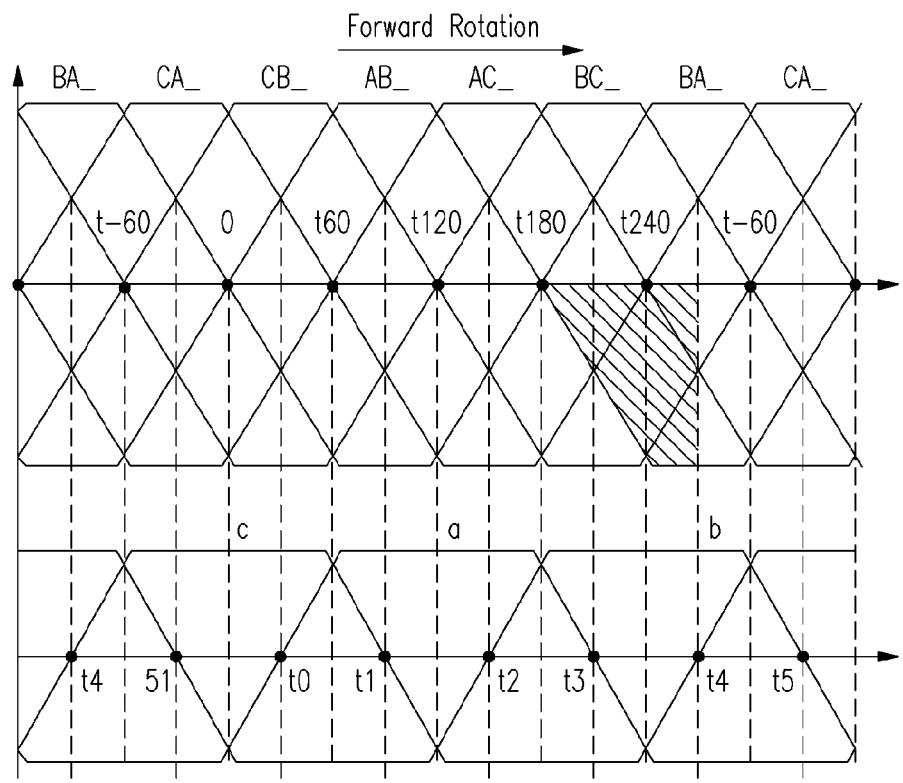

(3) Startup of the rotor from t180–t4: With reference to FIG. 7, the rotor is, for example, to be in an initial, rest position from t180–t4. By exciting the phase AB_ for a preset time T0, the motor is accelerated in a backward direction of rotation due to the passive torque, while the BEMF of phase C that is floating is positive. When the preset time T0 has elapsed, the detection of the BEMF ZCP is enabled. There is no ZCP until the rotor comes to the equilibrium point t180. Due to the inertia of the motor and the load, the rotor wouldn''t stop at the equilibrium t180. Once the rotor comes through the t180, the torque produced by the current AB_ becomes active. Therefore, the motor stops, then changes direction to forward. Upon the change of direction of rotation of the rotor, the relative BEMFs also switch polarity. This presents a pseudo ZCP and the BEMF of phase C becomes negative. Then the commutation is done immediately to the next phase AC_. The rotor accelerates in forward direction. Once the BEMF of the floating phase B is detected positive, the commutation is switched to the next phase BC_. After that, the startup routine is practically terminated and the motor may be controlled by any suitable technique.

Figure 8:
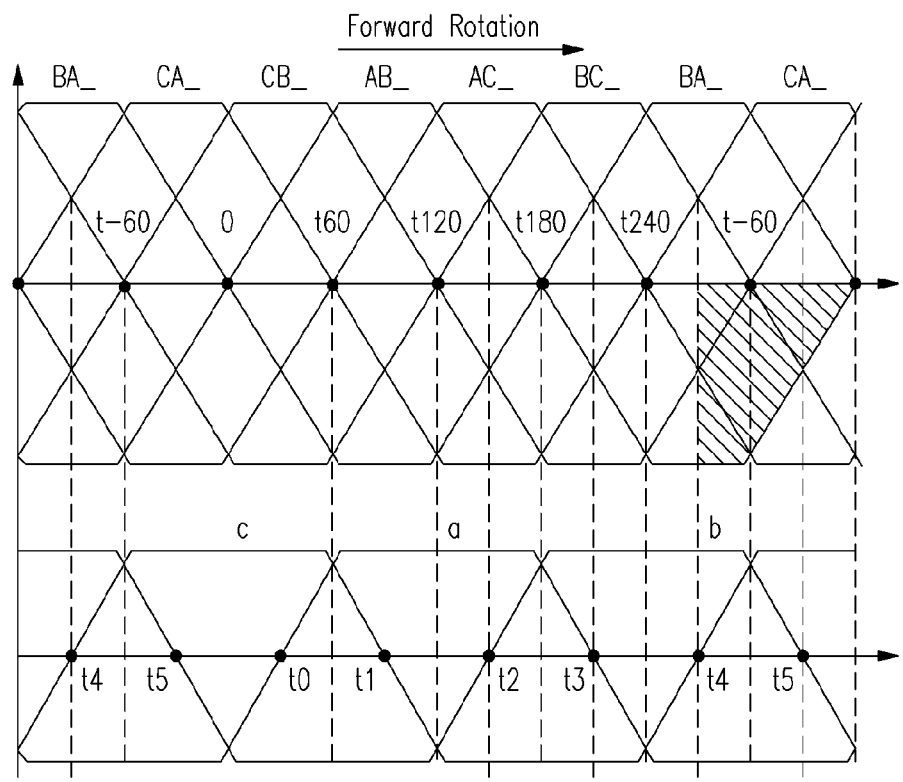

(4) Startup of the rotor from t4–0: With reference to FIG. 8, the rotor is, for example, to be in an initial, rest position from t4–t0. By exciting the phase AB_ for a preset time, the motor is accelerated in a backward direction of rotation due to the passive torque. The BEMF of phase C which is floating is negative. When the preset time has elapsed, the detection of the BEMF ZCP is enabled. A ZCP from negative to positive is detected when the rotor comes to the point t4. Ignoring this ZCP, the conducted phase is still AB_. There is no ZCP until the rotor comes to the equilibrium point t180. Due to the inertia of the motor and the load, the rotor wouldn't stop at the equilibrium t180. Once the rotor comes through the t180, the torque produced by the current AB_ becomes active. Therefore, the motor stops, then changes direction to forward. Upon the change of direction of rotation of the rotor, the relative BEMFs also switch polarity. This presents a pseudo ZCP, and the BEMF of phase C becomes negative. Then the commutation is done immediately to the next phase AC_. The rotor accelerates in forward direction. Once the BEMF of the floating phase B is detected positive, the commutation is switched to the next phase BC_. After that, the startup routine is practically terminated and the motor may be controlled by any suitable technique.

(5) Startup of the rotor from t180: As known, the rotor is at rest in an equilibrium point t180 of the excited phase AB_, it would not receive any acceleration because the applied torque is null. This particular situation can be recognized by that there is no ZCP when the maximum startup time Ts has elapsed. With reference to FIG. 7, the new phase to be excited in order to obtain the maximum torque in forward direction can be a phase shifted by 120° from the preset phase, i.e. the phase BC_. Then the next commutation to the phase BA_is to be performed once the BEMF negative-going ZCP of phase A is detected. After that, the startup routine is practically terminated and the motor may be controlled by any suitable technique.

It is evident that the initial, rest position of the rotor in t1–0, there is a backward rotation at the startup instant. In practice, for a poor situation, the maximum backward rotation of the rotor that may occur is about 180 electrical degrees.

Figure 9:
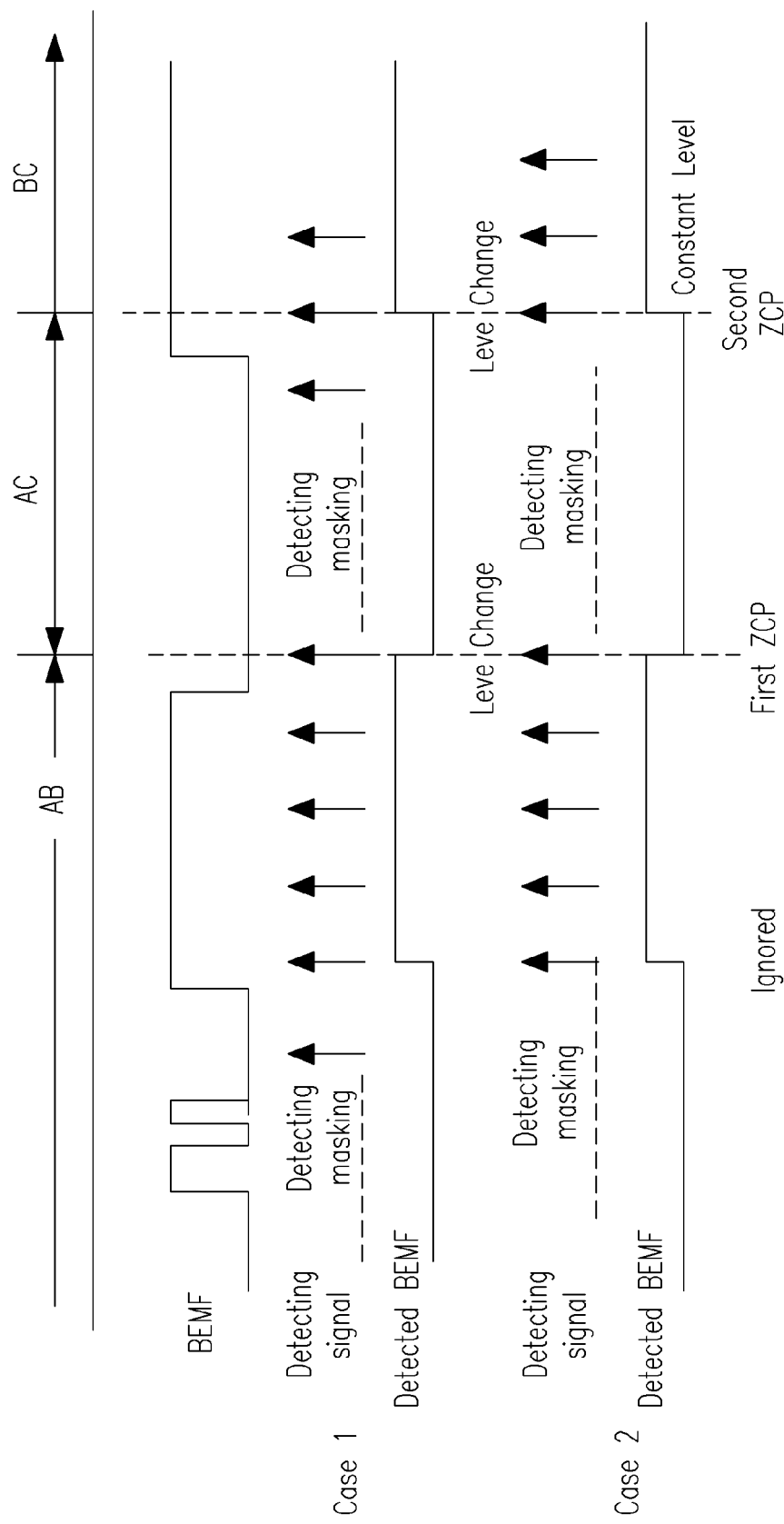
FIG. 9 is a timing diagram, schematically illustrating the features in time relation, according to the embodiment of the present invention.

In another aspect, the features of the invention is shown in FIG. 9. In FIG. 9, the time period with the arrows represents the detecting period. The BEMF has high levels and low levels. The level change is to be detected for the first ZCP. However, the level change is not necessary for the second ZCP. For example in case 1, during the first detecting period, the level change occurs. The level change also occurs during the second detecting period. In case 2, for the first detecting period, the level change occurs. However, no level change occurs during the second detecting period.

The ZCP can be negative-going ZCP or positive-going ZCP. It depends on the actual operation sequence. The forgoing description is only the example to describe the invention.

It can be recognized by one ordinary skilled in the art that the innovative concepts disclosed in the present application can be applied in a wide variety of contexts. Moreover, the preferred implementation can be modified in a tremendous variety of ways. Accordingly, it should be understood that the modifications and variations suggested below and above are merely illustrative. These examples may help to show some of the scope of the inventive concepts, but these examples do not nearly exhaust the full scope of variation in the disclosed novel concepts.

For example, the output of BEMF ZCP detecting is negative when the speed is too low to detect the BEMF or when the rotor is at rest in the preferred embodiment. However, the initial output of BEMF ZCP detecting may also be positive.

For another example, the interval of the preset masking time T0 may be unimportant if the BEMF ZCP detecting circuit has a large offset.

For another example, the preferred embodiment has been described in the specific configured motor which has only three windings, and which uses a permanent magnet rotor. However, the disclosed innovations can also be adopted to motors which include more than three windings.

For another example, it is not by any means necessary that the motor winding should be connected in a star configuration. Although this is a common and useful arrangement, the invention could also be applied to a delta-connected motor.

The invention claimed is:

1. A method for starting-up a motor having multiple stator windings and a rotor, comprising:

providing a current to a first winding and a second winding to excite a predefined initial excitation phase and allowing a third winding to be floating;

masking a time period to reach a state with reduced parasitic detection;

from the predefined initial excitation phase being currently excited, commutating to a next first excitation phase, which is adjacent to the predefined initial excitation phase in a predetermined sequence of excitation phases, if a zero-crossing point of BEMF for the third winding occurs in the third winding within a maximum startup time;

commutating to a next second excitation phase after commutating to the next first excitation phase when a zero-crossing point of BEMF of the second winding has been detected;

commutating to a next third excitation phase, which is functionally shifted by two phase-intervals from the predefined initial excitation phase if no zero crossing point of BEMF of the third winding occurs in the third winding within the maximum startup time; and commutating to a next fourth excitation phase after commutating to the next third excitation phase when a zero-crossing point of BEMF of the first winding has been detected.

2. The method of claim 1, wherein in the step of commutating to the next first excitation phase, a level change of the BEMP is also detected.

3. The method of claim 1, wherein in the step of commutating to the next fourth excitation phase, the zero-crossing point is a negative-going zero-crossing point.

4. The method of claim 1, wherein when the first, second, third windings are respectively denoted by A, B, and C, the predefine initial phase is the excitation phase AB_.

5. The method of claim 4, wherein when the step of commutating to the second excitation phase or the step of commutating to the fourth excitation phase has finished, the method for starting-up then exits.

6. The method of claim 4, wherein the predefined initial excitation phase is AB_, the next first excitation phase is AC_, the next second excitation phase is BC_, the next third excitation phase is BC_, and the fourth excitation phase is BA_.

* * * * *